July 22, 1969     G. R. YTZEN ET AL     3,456,916
BALL VALVE ASSEMBLY
Filed Jan. 12, 1967     2 Sheets-Sheet 1
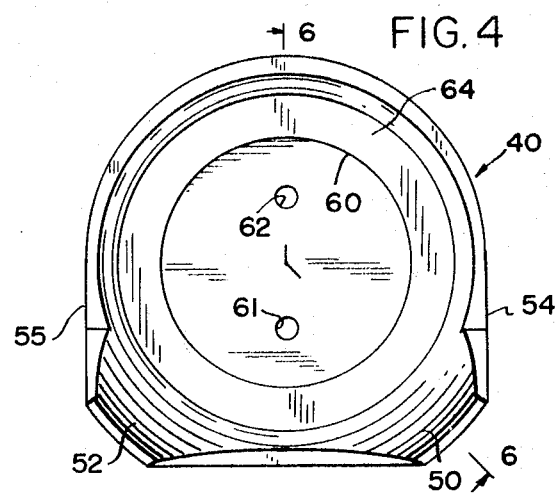
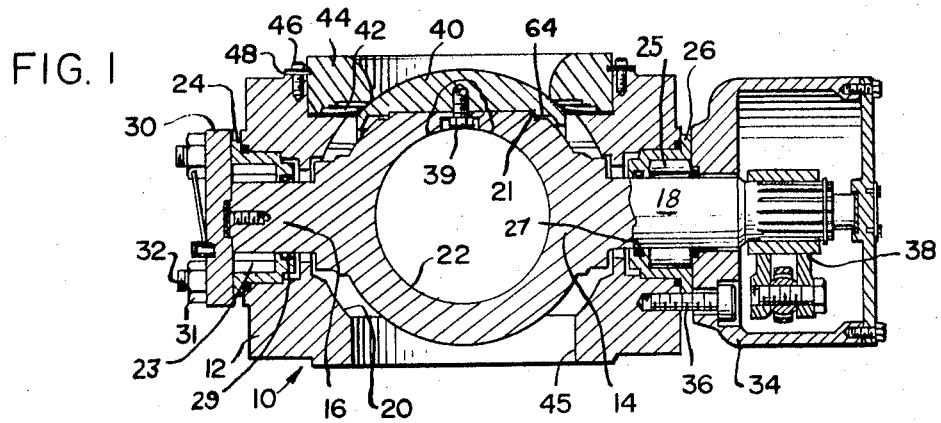
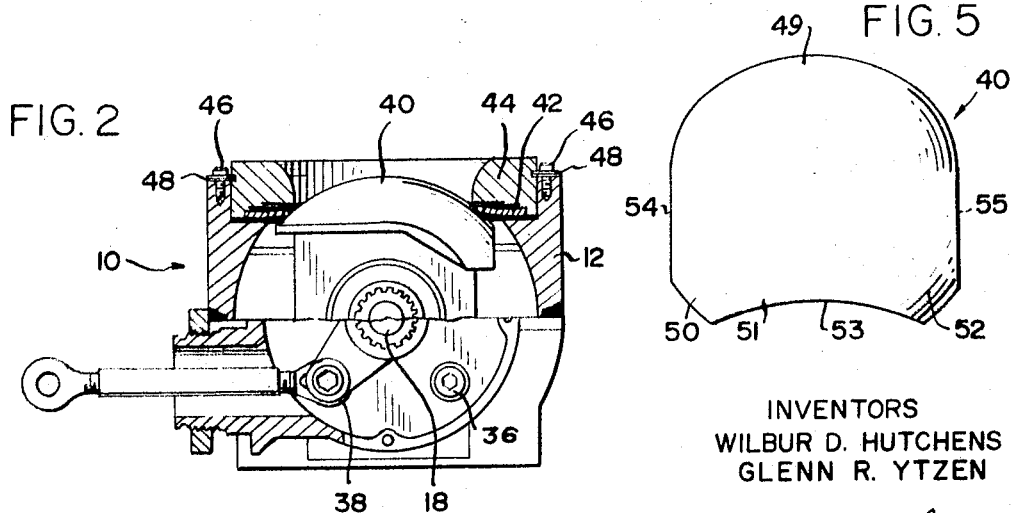
INVENTORS
WILBUR D. HUTCHENS
GLENN R. YTZEN
BY *Bair, Freeman & Molinare*
ATTORNEYS July 22, 1969  G. R. YTZEN ET AL  3,456,916
BALL VALVE ASSEMBLY Filed Jan. 12, 1967  2 Sheets-Sheet 2

INVENTORS
WILBUR D. HUTCHENS
GLENN R. YTZEN

BY
Bair, Freeman & Molinare
ATTORNEYS

United States Patent Office 3,456,916
Patented July 22, 1969

3,456,916
BALL VALVE ASSEMBLY
Glenn R. Ytzen and Wilbur D. Hutchens, Marshalltown, Iowa, assignors to Fisher Governor Company, a corporation of Iowa
Filed Jan. 12, 1967, Ser. No. 608,837
Int. Cl. F16k 5/06, 27/06
U.S. Cl. 251—309       6 Claims

ABSTRACT OF THE DISCLOSURE

This invention relates to a ball valve assembly, and more particularly, to a ball valve assembly having improved valve plug means therein. The novel valve plug means includes a cap member detachably secured to the valve plug. The cap member is generally spherical over a major portion of tis exterior sealing surface and includes a pair of spaced projections with a concave leading edge therebetween. The exterior surfaces of the projections have a smaller radius than the radius of the major portion and lie within an imaginary spherical surface extended from the major portion of the generally spherical surface. Thus, as the valve plug means closes, there will be a gradual pickup of the sealing ring and a wedging action as the sealing ring engages the spherical portion of the cap member to urge the sealing ring from its deflected form to its original installed form.

Background and summary of the invention

In the copending application of Wilbur D. Hutchens, Ser. No. 428,761 filed Jan. 28, 1965, there is disclosed a ball valve assembly having a welded valve body construction within which is disposed a unitary valve plug and shaft sub-assembly. The valve body comprised two body halves welded together such that the valve plug could not later be removed for servicing. A substantial portion of the ball assembly had to be machined in order to provide the necessary finely-polished accurate-sealing surface required for effective sealing of fluid flow between the inlet and outlet of the valve body. The cost of fabricating the valve plug was quite high and, in the event the sealing surface was scored or otherwise damaged in use, it was necessary to replace the entire ball valve assembly.

Another disadvantage of some prior constructions was that there was sometimes relatively high wear between the seal ring and the generally spherical exterior surface of the valve plug.

An object of the present invention is to provide an improved ball valve assembly wherein the valve plug includes a cap member detachably secured to the valve plug, the cap member being readily removable from the valve plug and from the valve body for replacement in the event the critical sealing surface should become damaged or eroded.

Another object of the present invention is to provide an improved ball valve assembly including valve plug means having a characterized configuration so as to provide adequate surface contact area between the exterior of the valve plug means and the seal means of the ball valve assembly during use so as to prevent the sealing means from being undersirably displaced or distorted due to presure differential between the upstream and downstream sides of the seal means and due to impact of fluid flow.

Yet another object of the present invention is to provide an improved ball valve assembly including a valve plug constructed and arranged so as to minimize friction between the valve plug and the annular seal means. Other objects and advantages of the present invention will become more apparent hereafter.

Brief Description of the Drawing

The invention will be particularly pointed out in clear, concise and exact terms in conjunction with the accompanying drawing wherein:

FIG. 1 is a cross-sectional view of a ball valve assembly embodying valve plug means made in accordance with principles of the present invention;

FIG. 2 is an end view of the ball valve assembly, with parts broken away for better illustrating the association between the cap member on the valve plug, the seal means, and the flow ring;

FIG. 4 is a bottom view of the cap member embodying the principles of the present invention;

FIG. 5 is a plan view of the cap member; and

Description of the preferred embodiment

Figure 3:
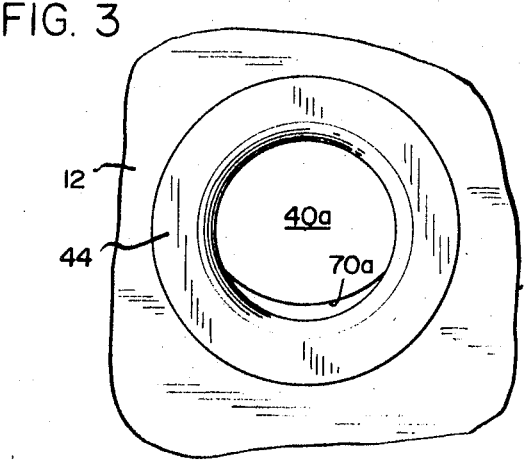
FIG. 3 is a detail view of a similar ball valve assembly having a spherical cap member and illustrating the position of the valve plug in almost fully-closed position, thereby providing a restricted flow opening.

Referring to FIGS. 1 and 2, there is illustrated an improved ball valve assembly 10 embodying the principles of the present invention. The ball valve assembly 10, which is adapted to provide for throttling control of process fluid with tight shut-off at both high and low pressure drops, includes a valve body or housing 12 within which there is disposed a valve plug and shaft assembly. The valve plug and shaft assembly includes a generally spherical valve plug means 14 having integrally secured thereto valve stems or shaft portions 16 and 18, which extend from opposite sides of the valve plug means 14 along a common axis. The valve plug means 14 is disposed in an enlarged generally spherical recess 20 defined in the body 12. Formed centrally through the valve plug means 14 is a central flow opening 22 for processing fluid passing through the valve body 12.

The valve stems 16 and 18 are journaled at each end in suitable bearings 23 and 25 retained in bearing carriers 24 and 26, which also contain the shaft seals 27 and 29. The bearing carrier 24 is retained in place by means of a cover plate 30 suitably secured to the valve body 12 by means of fastening means, which may include nuts 31 suitably secured to the ends of studs 32. Servicing of the valve is made easier by supporting the shaft seal and bearing in a common bearing carrier.

The bearing carrier 26 is secured in position by means of the actuator mechanism housing 34, which abuts the bearing means 26 and is affixed to the valve body 12 by means of suitable fastening means 36. The end of valve stem 18 extends into the actuator housing 34 and is connected therein to actuating linkage 38 for rotating the valve plug and shaft subassembly so as to selectively open and close the flow passage through the valve body.

Detachably secured to the valve plug means 14 is a cap member 40 that is adapted to cooperate with the annular seal means 42 held in place on the valve body by means of annular flow ring 44. The outer surface of the cap member 40 is generally spherical and is formed free from flat areas and imperfections. The cap member may be made from stainless steel and the other surface thereof may be coated with a hard surface coating material, such as chrome plating.

The annular seal ring 42, which may be fabricated from a suitable resilient plastic material such as nylon or Derlin, is retained in position by the annular flow ring 44 which is affixed to the valve body 12 by means including screws 46 which are adapted to retain washers 48 in engagement with a peripheral recess in the exterior surface of the flow ring 44.

The flow ring 44 defines an inlet opening to the valve body and functions (1) to retain the annular sealing ring 42 in position and (2) to deflect the flow stream to avoid direct impingement on the sealing ring and (3) for intermediate positions of opening, to provide a greater restriction between the valve plug and flow ring than between the valve plung and sealing ring to minimize fluid erosion on the sealing ring. The flow ring 44 is shaped to streamline the fluid flow to reduce the pressure drop across the valve.

In use, the valve plug 14 will be rotated from the closed position illustrated in FIGS. 1 and 2 counterclockwise to open the valve to fluid flow. The opening 22 in valve plug 14 will be in communication with the inlet opening defined in the flow ring 44 to permit the flow of fluid from the valve body inlet through the flow passage in the ball valve and be discharged from the outlet opening 45 at the rear of the valve body 12.

Figure 6:
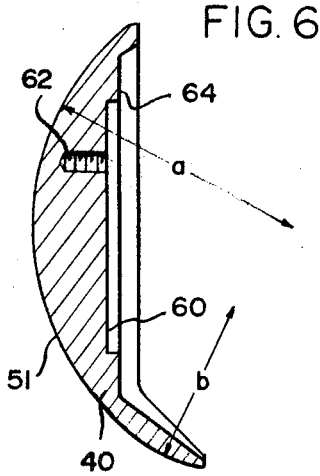
FIG. 6 is a cross-sectional view of the cap member taken generally along the line 6—6 of FIG. 4.

Considering now FIGS. 4, 5, and 6, there is more fully illustrated the novel construction of the cap member 40. An important feature of this invention is the configuration of the cap member so as to provide adequate sealing surface for engagement with the sealing means to prevent undesirable distortion of the seal ring 42 and possible loss of tight sealing due to increased pressure drops as the valve plug closes off the flow passage through ball valve assembly 10. The cap member, as seen in plan in FIG. 5, is comprised of a dome-like form having a generally semi-circular downstream portion 49 and an upstream portion 51 provided with a pair of spaced ear-like projections or extensions 50 and 52. The peripheral edge 53 between the ear-like projections 50 and 52 is substantially concave. As viewed in plan, the peripheral edge defining the generally semi-cylindrical portion 49 merges smoothly with generally planar edge portions 54 and 55 which blend into and define a part of the ear-like projections 50 and 52.

In FIG. 4, there is shown a bottom view of the cap member 40. A circular recessed portion 60 is provided centrally of the cap member 40. The circular recess portion 60 is adapted to cooperate with a projecting portion 21 on the valve plug 14 and the screw members 39 project through openings in the valve plug into engagement with the tapped openings 61 and 62 in the cap member for detachably securing the cap member 40 to the valve plug 14.

Referring now to FIG. 6, there is shown a cross-sectional view of the cap member taken generally along the line 6—6 of FIG. 4. The circular recessed portion 60, as noted before, cooperates with a complementary generally circular projection 21 on the valve plug 14 for proper orientation and positioning of the cap member 40 on the valve plug 14. An annular relieved portion 64 is provided on the cap member to assure clearance between the valve plug 14 and the cap member 40.

An important feature of the cap member of the present invention is the construction of the exterior surface thereof so as to facilitate restoration of the seal ring to its installed position and to reduce friction between the valve plug sealing surface and the seal 42. The seal ring 42 before installation is generally flat. When installed in place and with the ball valve plug closed, the seal ring is deflected toward the inlet of the valve. As the valve plug is rotated to open the valve, cap member 40 starts to separate from the seal ring. Because of inherent memory, the unsupported seal ring will tend to resume its original planar shape. In addition to the memory or "spring back," if there is pressure drop across the valve plug, this pressure differential, plus the impact force from the flow, will tend to deflect the seal ring 42 further in the same direction. The exterior surface of the cap member 40 is generally spherical over a major portion of its length, the exterior surface being formed to a radius indicated generally at $a$. Over a minor area of the surface adjacent the lead edge and defined generally by the ear-like projections 50 and 52, there is a smaller radius of curvature.

In one present embodiment of the invention embodying a six inch diameter valve plug, radius $a$ of the cap member is on the order of 4.064 inches and radius $b$ is on the order of 2.500 inches. The exterior sealing surfaces defined by the larger and smaller radii blend smoothly with one another.

Figure 3A:
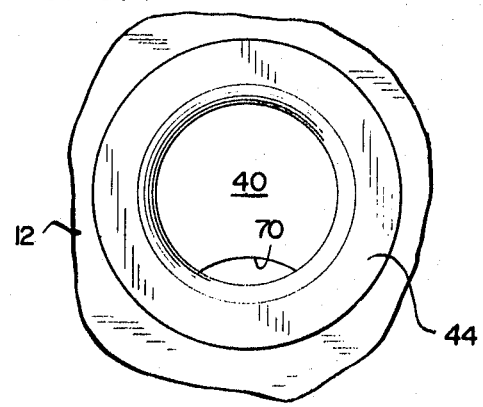
FIG. 3a is a detail view, similar to FIG. 3, of the ball valve assembly of the present invention, illustrating the configuration of the flow opening when the valve plug is in the same position as the valve plug in the device shown in FIG. 3.

Turning now to FIGS. 3 and 3a, there is better illustrated an important advantage resulting from the novel configuration of the cap member 40 of this invention. Since the two figures illustrate similar ball valve assemblies except for the valve plug means, like numerals will be used in the two views for like elements. In FIG. 3, there is shown a fragmentary view of a ball valve assembly illustrating a valve plug with a cap member in the form of a spherical segment in place within the ball valve assembly. It will be noted that the opening 70a defined between the generally spherical segment of the valve plug 40a and the seal ring 42 has an elongated moon-like shape. It has been found that as the valve plug closes, reducing the size of opening 40a, there results increased pressure drops and the fluid flow distorts the seal ring 42 downstream in the clearance area between the valve plug and the valve body support for the seal ring 42.

In FIG. 3a, there is illustrated a ball valve assembly embodying the improved valve plug of the present invention. It is seen that at a comparable valve opening, the resultant flow opening 70 through the valve has substantially the same area as that illustrated in FIG. 3, however, the unsupported surface of the seal ring is substantially less. Thus, it is seen that by utilization of a cap member having ear-like projections 50 and 52 as best shown in FIGS. 4 and 5, adequate support is provided for the seal ring throughout full range movement of the ball valve to prevent the sealing means from being distorted or moved from firm sealing engagement between flow ring 44 and the front face of valve body 12 due to increased pressure differentials across the seal ring 42 or from being distorted due to impact of the fluid stream.

The formation of the exterior surface of the valve plug cap member to provide for a smaller radius in the area of the ear-like projections adjacent to the leading edge as compared with the radius of the major portion of the cap member provides a gradual wedging action to force the seal ring 42 from its pressure deflected form back to its original installed position and also reduces the friction between the exterior surface of the valve plug and the seal ring 42, thereby improving the seal wear characteristics. The second "radius" need not be a true radius. To function as desired, it is necessary that the leading edge of the eared portions be closer to the center of the spherical surface than the majority of the cap member so as to provide for gradual pick-up of the sealing ring and to provide a wedging action as the seal ring engages the true spherical portion of the cap member.

The improved ball valve assembly incorporates novel valve plug means provided with sufficient surface contact area thereon to adequately support the seal means and prevent the seal means from being undesirably distorted due to increased pressure differentials across the seal ring during use. Another feature of this invention is the formation of the exterior sealing surface of the valve plug means to a relatively large curvature over a major portion of the sealing surface and to a relatively smaller curvature over a minor portion of the sealing surface adjacent the leading edge of the valve plug (or stated another way, the leading edge surface is closer to the center of the spherical surface than the major spherical portion of the cap member) to provide a reduction in the friction between the valve plug and the seal means as the valve plug moves to the closed position and to gradually wedge the seal means back to the undeflected position so as to improve the seal means wear characteristics. The cap member is detachable from the valve plug to permit repair or replacement of the critical sealing surfaces in the event of damage in use.

We claim:

1. In a ball valve assembly comprising an inlet and an outlet communicated by a passageway, valve plug means disposed in said passageway having a central opening therethrough and a generally spherical outer sealing surface, means for rotating the valve plug means, and annular seal means in said valve body cooperating with said sealing surface of said valve plug means for confining flow from the inlet of the valve body through the opening in the valve plug means, the improvement chaacterized by said valve plug means being formed adjacent the lead edge with spaced-apart ear-like projections, the peripheral edge between the ear-like projections being concave, the portion of the sealing surface defined by and between the ear-like projections providing extended surface contact area for engaging with and supporting the annular seal means to prevent the seal means from being undesirably displaced due to increased pressure differentials between the upstream and downstream sides of the seal means, the exterior surface of the ear-like projections adjacent the lead edge of the valve plug means lying within an imaginary surface extended from the major portion of the spherical exterior sealing surface so as to gradually wedge the seal ring from its deflected form back to its original installed form and to reduce friction between the valve plug means and the seal means.

2. A ball valve assembly as in claim 1 wherein the spherical outer sealing surface extends over the major portion of the valve plug means, and the major portion of the exterior sealing surface is formed generally with a first larger radius, with the minor portion adjacent the lead edge being formed with a second smaller radius, the major and minor surfaces merging smoothly, the minor portion of the sealing surface lying within the imaginary extended surface of the major portion, so as to reduce the friction between the valve plug means and the seal means and thereby improve the seal means wear characteristics.

3. A ball valve assembly including a valve body having a flow passage therethrough, a valve plug having an opening therethrough adapted to be disposed in said flow passage within the valve body for controlling fluid flow therethrough, shaft means joined to said valve plug for rotatably carrying the valve plug in the valve body for rotation about an elongated axis generally transverse to the flow passage, annular seal means in the valve body abutting the valve plug for preventing flow between the inlet and outlet in the valve body characterized by an improved valve plug, including a cap portion having a finely finished exterior sealing surface cooperating with said sealing means to provide effective sealing between the valve plug and the valve body, the cap portion having a dome-like form when viewed in plan and including a generally semi-circular downstream portion and an upstream portion having a pair of spaced ear-like projections extending therefrom, the peripheral edge of the cap portion between the ear-like projections being curved generally concave and the projections providing extended surface contact area between the cap portion and seal means during use of the ball valve assembly to prevent the seal means from being undesirably distorted due to increased pressure differentials between the upstream and downstream sides of the seal means, with the radius of curvature of the ear-like projections being less than the radius of curvature at the major portion of the cap portion.

4. A ball valve assembly as in claim 3, wherein the major exterior surface of the cap portion excluding the ear-like projections is spherical and is formed by a first radius and the exterior surface of the ear-like projections lies within an imaginary spherical surface extended from the major exterior surface, so as to reduce the friction between the valve plug and the seal means and thereby improve the seal means wear characteristics.

5. A ball valve assembly as in claim 3 wherein the cap portion has a spherical sealing surface with a first radius over the major portion thereof, the external surface of the ear-like projections adjacent the lead edge of the cap portion defining a minor portion having a second radius smaller than said first radius and the minor portion lying within an imaginary spherical surface extended from the major portion to gradually wedge the seal ring from its deflected form to its installed form as the valve plug moves to position to prevent fluid flow from the inlet to the outlet.

6. A ball valve assembly as in claim 3 wherein the cap portion is detachably secured to the valve plug.

References Cited

UNITED STATES PATENTS

| 3,131,906 | 5/1964 | King | 251—315 X |
| 3,191,906 | 6/1965 | Zeigler et al. | 251—208 |
| 3,195,560 | 7/1965 | Pofit | 251—315 X |
| 3,284,046 | 11/1966 | Allenbaugh | 251—315 |

FOREIGN PATENTS 1,147,569  11/1957  France.

HENRY T. KLINKSIEK, Primary Examiner

MICHAEL O. STURM, Assistant Examiner

U.S. Cl. X.R.

251—315